No. 685,645. Patented Oct. 29, 1901.
J. J. ROSE.
WATER PURIFIER.
(Application filed July 8, 1901.)
(No Model.)
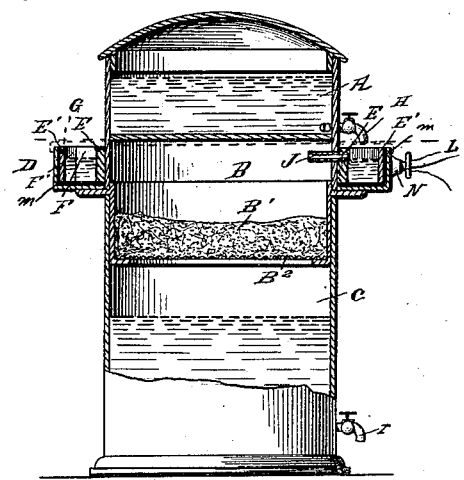
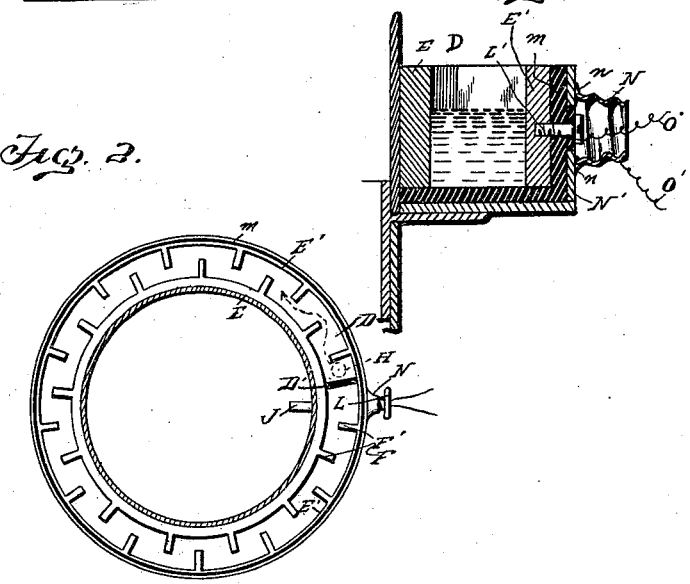
Inventor
JOHN J ROSE
Witnesses
L. G. Handy.
A. M. Meynes
By
Mason Fenwick & Lawrence.
Attorneys

UNITED STATES PATENT OFFICE.

JOHN J. ROSE, OF BROOKLYN, NEW YORK, ASSIGNOR TO JOHN C. HENDERSON, OF NEW YORK, N. Y.

WATER-PURIFIER.

SPECIFICATION forming part of Letters Patent No. 685,645, dated October 29, 1901.

Application filed July 8, 1901. Serial No. 67,502. (No model.)

*To all whom it may concern:*

Be it known that I, JOHN J. ROSE, a citizen of the United States, residing in the borough of Brooklyn and State of New York, have invented certain new and useful Improvements in Water-Purifiers; and I do hereby declare the following to be a full, clear, and exact description of the invention, such as will enable others skilled in the art to which it appertains to make and use the same.

This invention relates to means for purifying water especially designed for domestic purposes, but applicable for other purposes as well.

The object of the invention is not to provide an improved filterer for purifying water, but to provide means whereby all forms of low animal life, organic matter, germs, bacilli, &c., are destroyed and caused to form a congealed mass, which may be readily and quickly removed from the water by any ordinary strainer or filter.

With these objects in view the invention consists in the improved construction, arrangement, and combination of parts, as will be hereinafter fully described, and specifically claimed.

In the accompanying drawings, which illustrate one embodiment of my invention, Figure 1 is a vertical sectional view of a complete water-purifier constructed in accordance with my invention; and Fig. 2 is a transverse horizontal sectional view thereof, taken on the plane indicated by the broken line 2 2 of Fig. 1. Fig. 3 represents an enlarged detailed section taken through the electrical connections to the electrodes.

Like letters of reference indicate the same parts in all the figures of the drawings.

Referring to the drawings by letters, A indicates a tank for containing impure water, and B a compartment below the tank A, containing any ordinary filtering material, as at B', and provided with a perforated or reticulated bottom B².

C indicates a tank for receiving the purified water from the filtering-tank B, the latter being inserted in the upper end of the tank C and supported upon its upper edges in any desired manner.

Below the level of the tank A and above the level of the filtering matter B' in the tank B an annular trough D, surrounding the tank B, is secured in any suitable manner. Within the trough D are two rings of any suitable metal, preferably an alloy of magnesium and aluminium, but may be carbon or other material which is a good or fair conductor of electricity, as at E and E', the ring E being secured around the inner wall of the trough D and the ring E' within the outer wall of said trough, each of the rings being properly insulated from the wall to which it is secured and from the bottom of the trough. These metal rings are formed in a manner to interrupt the flow of water around the trough and are preferably shown provided with teeth F, projecting radially outward from ring E, and teeth F', projecting radially inward from the ring E'. The two sets of teeth alternate with and overlap each other at a proper distance apart to permit of the somewhat interrupted flow of the water through the trough, such construction giving greatly-increased surface for electric or galvanic action. The trough may or may not be provided with a loose or tight-fitting cover, as G, in order that it may be removed for the purpose of cleaning or removing and replacing the ring.

H indicates a discharge-cock in the bottom of tank A, I a discharge-cock in the bottom of tank C, and J an overflow-pipe from trough D, discharging into tank A upon filtering material B'.

D' indicates a partition in the trough D, between cock H and pipe J, which prevents liquid discharged from said cock into the trough from cock H from flowing in but one direction and causing it to flow entirely around the trough to reach pipe J.

Water or other liquid requiring purification is placed in the tank A or any suitable tank and is delivered through the cock H into the trough D, and, running around the trough, overflows and is discharged through pipe K upon the filtering material B', from whence it passes through the filtering material and descends into the tank C in a purified condition.

By means of a plug-socket L electrical connection is made with the rings E and E', so that the water or other liquid to be purified is electrically or galvanically charged or operated upon while passing through the trough from the cock H around the trough D in the direction indicated by the arrow in Fig. 2. Of course it will be understood that I may employ any preferred form of electrical connections; but I have illustrated in detail in Fig. 3 one particular embodiment of this feature of the present invention, and in this view it will be seen that I employ one pole, as L', which communicates directly with electrode E' and is insulated by suitable insulation, as $m$, from all surrounding parts. A screw-cap, as N, forms the opposite pole and is preferably soldered, as at $n\ n$, to a plate, as N', which is electrically connected, as shown, with tank A, which in turn is electrically connected with electrode E. The poles L' and N are insulated from each other by suitable insulation $m$, whereby all electrical intercommunication between electrode E with E' must be had through the water contained therebetween, the electricity being supplied to said electrodes from any preferred source of power through conductors, as O and O'.

Having thus fully described my invention, what I claim as new, and desire to secure by Letters Patent of the United States, is—

1. A water-purifier comprising a trough, plates of good or fair conducting material secured inside the trough and insulated therefrom, lugs or teeth projecting from each plate into the space between the plates, and means for connecting the plates and lugs in an electrical galvanic circuit, substantially as described.

2. A water-purifier comprising an annular trough, rings of good or fair conducting material secured inside the trough upon the opposite walls thereof, teeth of the same material projecting alternately inward and outward from the respective plates, insulating material between the plates and the trough, and means for connecting the plates in an electric galvanic circuit, substantially as described.

3. A water-purifier comprising a tank or receptacle, filtering material contained therein, a trough secured to the tank above the filtering material, electrically connected and insulated conducting-rings in the trough, means for supplying the trough with water, and an overflow-pipe for the trough adapted to discharge water upon the filtering material in the tank, substantially as described.

4. A water-purifier comprising a storage-tank, a tank secured upon the end thereof having a reticulated or perforated bottom, filtering material in the last-named tank, a supply-tank, an annular trough secured to the filtering-tank above the level of the filtering material, plates of good or fair conducting material secured to, but insulated from the inside of the walls of the trough, and provided with a device for interrupting the flow of water around the tank, means for discharging supply-water into the tank, an overflow-pipe from the trough for discharging the water from the trough upon the filtering material, and means for connecting the plates in the trough in an electric galvanic circuit, substantially as described.

In testimony whereof I hereunto affix my signature in presence of two witnesses.

JOHN J. ROSE.

Witnesses:
D. H. STARIN,
H. A. GREASON.